(12) United States Patent
Maruyama et al.

(10) Patent No.: US 8,925,248 B2
(45) Date of Patent: Jan. 6, 2015

(54) VEHICLE DOOR STRUCTURE HAVING A LOCK MECHANISM AND SLIDE DOOR

(71) Applicant: Kabushiki Kaisha Toyota Jidoshokki, Kariya-shi, Aichi (JP)

(72) Inventors: Katsuya Maruyama, Kariya (JP); Yoshio Ojima, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 13/932,417

(22) Filed: Jul. 1, 2013

(65) Prior Publication Data
US 2014/0026487 A1      Jan. 30, 2014

(30) Foreign Application Priority Data
Jul. 27, 2012   (JP) ................................. 2012-167310

(51) Int. Cl.
| | |
|---|---|
| *B60J 5/06* | (2006.01) |
| *E05D 15/48* | (2006.01) |
| *B60J 5/04* | (2006.01) |
| *E05D 15/58* | (2006.01) |
| *E05D 15/10* | (2006.01) |

(52) U.S. Cl.
CPC . *B60J 5/06* (2013.01); *E05D 15/48* (2013.01); *B60J 5/047* (2013.01); *E05D 15/58* (2013.01); *E05D 2015/1026* (2013.01); *E05D 2015/1063* (2013.01); *E05Y 2900/531* (2013.01)
USPC .................. 49/209; 49/208; 49/210; 49/221; 49/223; 49/143; 49/142; 49/163; 49/164; 49/166; 49/168; 49/176; 296/155; 296/146.11

(58) Field of Classification Search
CPC ................ B60J 5/06; B60J 5/49; E05D 15/10
USPC ........... 49/207–210, 213, 214, 221, 223, 142, 49/143, 360, 152–155, 163, 164, 166, 168, 49/176, 177, 188, 98, 103, 104; 160/211, 160/218, 220, 197; 296/155, 146.11
See application file for complete search history.

(56) References Cited

U.S. PATENT DOCUMENTS

| | | | | |
|---|---|---|---|---|
| 4,502,246 | A | * | 3/1985 | Minami ........................... 49/322 |
| 5,454,618 | A | * | 10/1995 | Sullivan ..................... 296/97.22 |

(Continued)

FOREIGN PATENT DOCUMENTS

| | | |
|---|---|---|
| EP | 2 471 678 A1 | 7/2012 |
| JP | 57180072 U | 11/1982 |

(Continued)

OTHER PUBLICATIONS

Extended European Search Report for corresponding EP Patent Application No. 13173942.7 dated Dec. 2, 2013.

*Primary Examiner* — Katherine Mitchell
*Assistant Examiner* — Marcus Menezes
(74) *Attorney, Agent, or Firm* — Sughrue Mion, PLLC (57) ABSTRACT

A vehicle door structure comprises a slide door panel for opening and closing a front region of a rear door opening of a vehicle body and a swing door panel for opening and closing a rear region of the rear door opening in cooperation with the slide door panel, swing door panel lock mechanisms for locking the swing door panel with respect to the vehicle body when the swing door panel is fully closed, and slidability setting mechanisms provided with the vehicle body. Slide rails are provided in upper and lower parts of the vehicle body, while rollers are attached to upper and lower parts of the slide door panel. The slidability setting mechanisms permit the rollers to be introduced to the slide rails only when the swing door panel is locked with respect to the vehicle body.

4 Claims, 5 Drawing Sheets

(56) References Cited

U.S. PATENT DOCUMENTS

| | | | |
|---|---|---|---|
| 5,906,026 A * | 5/1999 | Junttila | 16/85 |
| 6,422,287 B1 * | 7/2002 | Wilke | 160/92 |
| 7,097,229 B1 * | 8/2006 | Chernoff | 296/146.1 |
| 7,699,363 B2 * | 4/2010 | Langfermann et al. | 292/216 |
| 8,567,126 B2 * | 10/2013 | Hozumi et al. | 49/360 |
| 2006/0197357 A1 * | 9/2006 | Catania | 296/155 |
| 2007/0062118 A1 * | 3/2007 | Lindemann et al. | 49/209 |
| 2009/0267383 A1 * | 10/2009 | Fischer et al. | 298/155 |
| 2012/0073205 A1 * | 3/2012 | Hamaker et al. | 49/163 |
| 2012/0167468 A1 | 7/2012 | Hozumi et al. | |

FOREIGN PATENT DOCUMENTS

| | | |
|---|---|---|
| JP | 0484683 U | 7/1992 |
| JP | 0528873 U | 4/1993 |
| JP | 2011-46271 A1 | 3/2011 |

\* cited by examiner

VEHICLE DOOR STRUCTURE HAVING A LOCK MECHANISM AND SLIDE DOOR

BACKGROUND OF THE INVENTION

1. Field of the Invention

The present invention relates to a vehicle door structure comprising a slidably openable and closable slide door panel and a swingably openable and closable swing door panel.

2. Related Background Art

As an example of conventional vehicle door structures, one described in Japanese Patent Application Laid-Open No. 2011-46271 has been known. The vehicle door structure described in Japanese Patent Application Laid-Open No. 2011-46271 comprises a slide door panel for opening and closing a front region of a rear door opening and a swing door panel for opening and closing a rear region of the rear door opening in cooperation with the slide door panel. The slide door panel slides longitudinally of a vehicle body through a slide mechanism. The slide mechanism has a slide rail provided with a vehicle body and rollers provided with the slide door panel and adapted to be guided by the slide rail. When overlaid on the slide door panel, the swing door panel rotates with respect to the vehicle body through a hinge mechanism. The vehicle door structure also comprises a swing door opening/closing restricting mechanism for interlocking (locking) the swing door panel and the vehicle body with each other when the swing door panel is fully closed.

In the vehicle door structure of the prior art mentioned above, even when the swing door panel and the vehicle are not completely locked with each other, the rollers provided with the slide door panel can be introduced to the slide rail, which enables an operation for closing the slide door panel. If the slide door panel is closed in the state where the swing door panel and the vehicle body are incompletely locked, abnormal noises may occur during when the vehicle is running.

It is an object of the present invention to provide a vehicle door structure which can prevent the slide door panel from closing in the state where the swing door panel and the vehicle body are locked incompletely with each other.

SUMMARY OF THE INVENTION

In one aspect, the present invention provides a vehicle door structure comprising a slide door panel for opening and closing a first region of a door opening provided in a side or rear part of a vehicle body and a swing door panel for opening and closing a second region of the door opening in cooperation with the slide door panel; the vehicle door structure further comprising a lock mechanism for locking the swing door panel with respect to the vehicle body when the swing door panel is fully closed, a slide rail provided with the vehicle body so as to extend in the opening and closing direction of the slide door panel, a roller provided with the slide door panel and adapted to be guided by the slide rail, and a slidability setting mechanism for permitting the roller to be introduced to the slide rail only when the swing door panel is locked with respect to the vehicle body by the lock mechanism.

This vehicle door structure permits the roller to be introduced to the slide rail only when the swing door panel is locked with respect to the vehicle body by the lock mechanism. As a consequence, when the swing door panel is not locked with respect to the vehicle body, the vehicle door structure prohibits the roller from being introduced to the slide rail, whereby the slide door panel cannot be closed along the slide rail. Hence, the vehicle door structure can prevent the slide door panel from closing in the state where the swing door panel and the vehicle body are locked incompletely with each other.

One embodiment may be constructed such that the lock mechanism has a lock member provided with the swing door panel and an engagement member, provided with the vehicle body, for engaging the lock member, the slidability setting mechanism comprises a roller stopper for blocking the roller from being introduced to the slide rail and a lock detection member, connected to the roller stopper, for detecting an engagement of the lock member with the engagement member, allows the roller stopper to enter a position in front of a roller-introducing part of the slide rail when the engagement of the lock member with the engagement member is undetected by the lock detection member, and retracts the roller stopper from the position in front of the roller-introducing part of the slide rail when the engagement of the lock member with the engagement member is detected by the lock detection member.

When the swing door panel is not locked with respect to the vehicle body due to the fact the lock member is not engaged with the engagement member, the vehicle door structure allows the roller stopper to enter a position in front of the roller-introducing part of the slide rail, so as to make it impossible for the roller to be introduced to the slide rail, whereby the slide door panel cannot be closed. When the swing door panel is locked with respect to the vehicle body due to the fact that the lock member is engaged with the engagement member, the roller stopper retracts from the position in front of the roller-introducing part of the slide rail, so as to make it possible for the roller to be introduced to the slide rail, whereby the slide door panel can be closed.

One embodiment may be constructed such that the roller stopper is attached to the vehicle body through a spring, the lock detection member is swingably attached to the vehicle body, the roller stopper is connected to one end side of the lock detection member through a connection member, and the lock member abuts to the other end side of the lock detection member.

When the lock member is not engaged with the engagement member in the vehicle door structure, a biasing force of the spring causes the roller stopper to enter the position in front of the roller-introducing part of the slide rail, thereby making it impossible for the roller to be introduced to the slide rail. When the lock member is engaged with the engagement member in the vehicle door structure, on the other hand, the lock member hits the lock detection member, so as to swing the latter, thus pulling the connection member toward the lock detection member, which causes the roller stopper to retract from the position in front of the roller-introducing part of the slide rail against the biasing force of the spring, whereby the roller can be introduced to the slide rail. This construction allows the slidability setting mechanism to act accurately.

One embodiment may be constructed such that the lock detection member is attached to the vehicle body through a spring, the roller stopper is fixed to one end side of the lock detection member, and the lock member abuts to the other end side of the lock detection member.

When the lock member is not engaged with the engagement member in the vehicle door structure, a biasing force of the spring causes the roller stopper to enter the position in front of the roller-introducing part of the slide rail through the lock detection member, thereby making it impossible for the roller to be introduced to the slide rail. When the lock member is engaged with the engagement member in the vehicle door structure, on the other hand, the lock member hits the lock detection member, which causes the roller stopper to retract from the position in front of the roller-introducing part of the slide rail against the biasing force of the spring, whereby the roller can be introduced to the slide rail. This construction can simplify the structure of the slidability setting mechanism.

The present invention can prevent the slide door panel from closing in the state where the swing door panel and the vehicle body are locked incompletely. This can prevent abnormal noises from occurring during when the vehicle is running.

DESCRIPTION OF THE PREFERRED EMBODIMENTS

In the following, preferred embodiments of the present invention will be explained with reference to the drawings. In the drawings, the same or equivalent constituents will be referred to with the same signs while omitting their overlapping descriptions.

Figure 1:
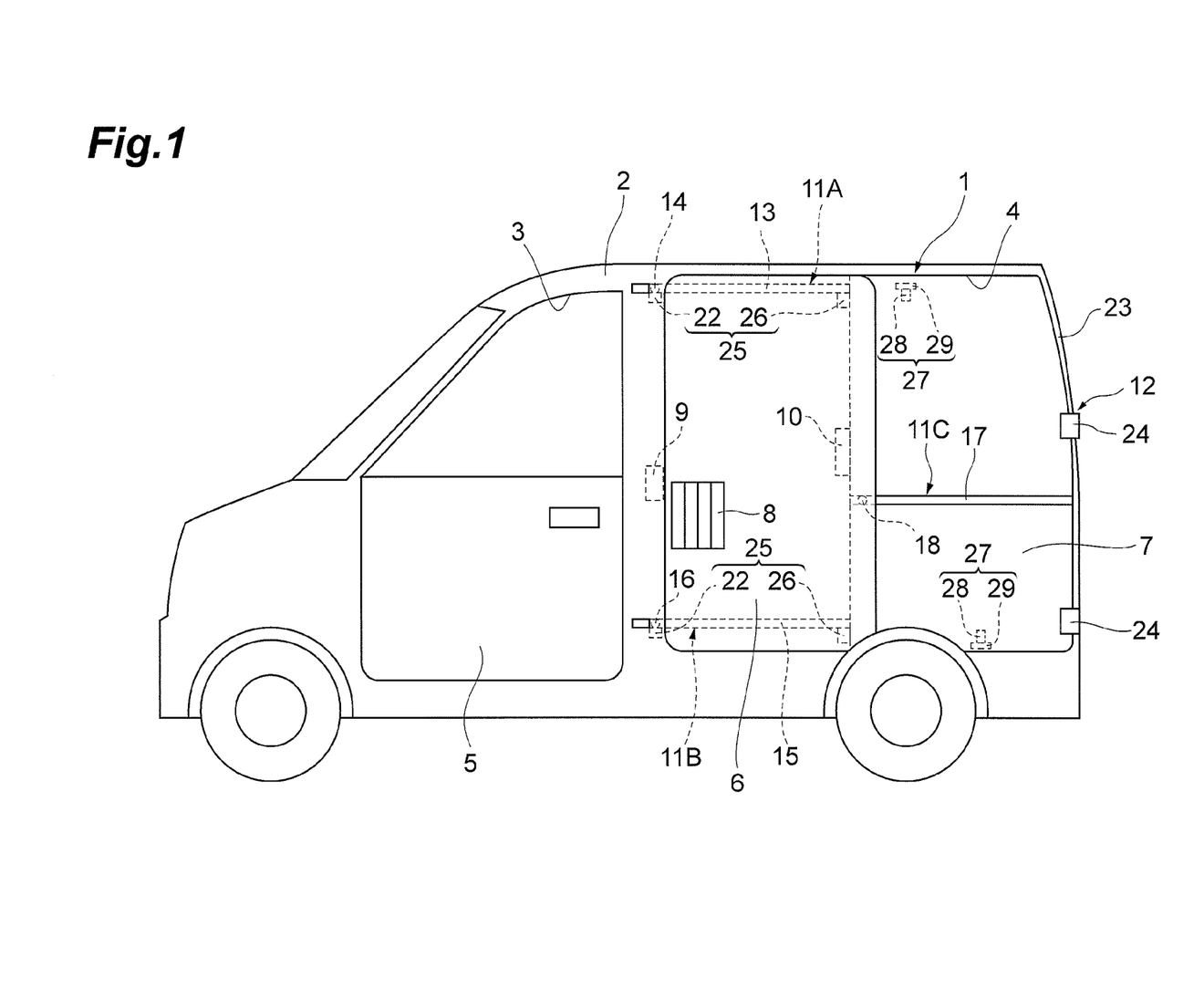
FIG. 1 is a side view illustrating a vehicle equipped with one embodiment of the vehicle door structure.

FIG. 1 is a side view illustrating a vehicle equipped with one embodiment of the vehicle door structure. In this drawing, a vehicle door structure 1 in accordance with this embodiment is applied to a side part of a vehicle body 2. The side part of the vehicle 2 is formed with a front door opening 3 located beside front seats and a rear door opening 4 located beside a luggage compartment disposed behind the front seats. The front door opening 3 is opened and closed by a front door panel 5.

Figure 2A:
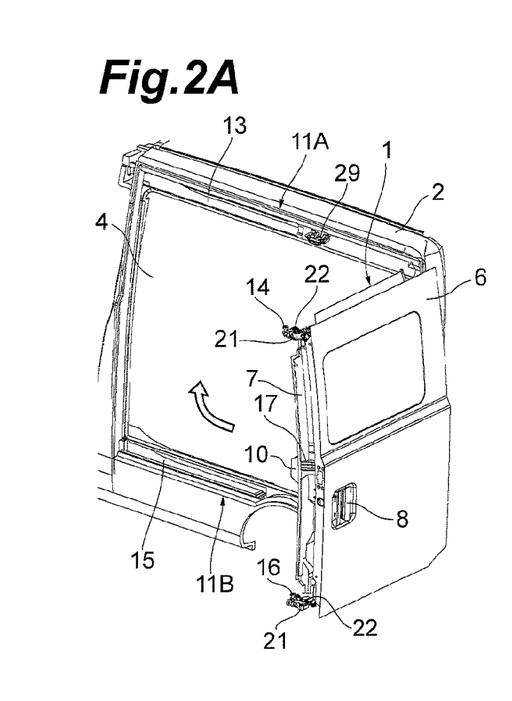
FIGS. 2A, 2B and 2C are a set of perspective views illustrating how swing and slide door panels are closed.
Figure 2B:
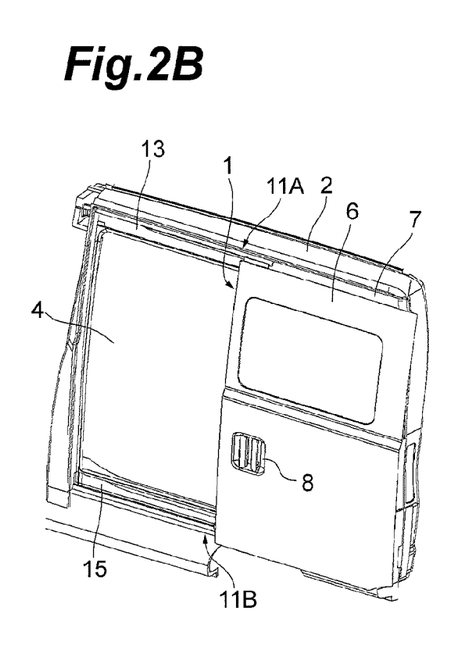

The rear door opening 4 is opened and closed by a slidably openable and closable slide door panel 6 and a swingably openable and closable swing door panel 7. The slide door panel 6 is constructed such as to slide longitudinally of the vehicle body 2 as illustrated in FIGS. 2A and 2B, thereby opening and closing a first region located on the front side of the rear door opening 4. When fully opened, the slide door panel 6 is located on the outside of the swing door panel 7 and overlies the latter (see FIG. 2B).

The swing door panel 7 is constructed so as to rotate with respect to the vehicle body 2 when the slide door panel 6 is fully opened so as to overlie the swing door panel 7, thereby opening and closing a second region located on the rear side of the rear door opening 4 in cooperation with the slide door panel 6, as illustrated in FIG. 2A.

The outer surface of the slide door panel 6 is provided with an outer door opening and closing handle 8, while the inner surface of the slide door panel 6 is provided with an inner door opening and closing handle 9. A front end part of the swing door panel 7 is provided with a door opening and closing handle 10.

The vehicle door structure 1 comprises slide support mechanisms 11A to 11C for supporting the slide door panel 6 such that the latter is slidable longitudinally of the vehicle 2 and a rotary support mechanism 12 for supporting the swing door panel 7 such that the latter is rotatable with respect to the vehicle body 2.

The slide support mechanism 11A has an upper slide rail 13 disposed in the upper part of the vehicle body 2 so as to extend longitudinally of the vehicle body 2 and a roller 14 disposed in the upper part of the front end of the slide door panel 6 and adapted to be guided by the upper slide rail 13 when opening and closing the slide door panel 6. The slide support mechanism 11B has a lower slide rail 15 disposed in the lower part of the vehicle body 2 so as to extend longitudinally of the vehicle body 2 and a roller 16 disposed in the lower part of the front end of the slide door panel 6 and adapted to be guided by the lower slide rail 15 when opening and closing the slide door panel 6. The slide support mechanism 11C has a middle slide rail 17 provided with the swing door panel 7 so as to extend longitudinally of the vehicle body 2 and a roller 18 disposed in a rear end part of the slide door panel 6 and adapted to be guided by the middle slide rail 17 when opening and closing the slide door panel 6.

As illustrated in FIG. 2A, the rollers 14, 16 are supported by respective brackets 21, which are attached to the upper and lower parts of the front end of the slide door panel 6, so as to be freely rotatable. Latches 22 are attached to the brackets 21, respectively.

The rotary support mechanism 12 has two, i.e., upper and lower, hinges 24 for rotatably connecting a rear pillar 23, which is provided in a rear end part of the vehicle 2, and the swing door panel 7 to each other.

The vehicle door structure 1 further comprises two, i.e., upper and lower, door panel lock mechanisms 25 for locking the slide door panel 6 and swing door panel 7 with each other when the slide door panel 6 is fully opened and overlies the swing door panel 7.

Figure 3:
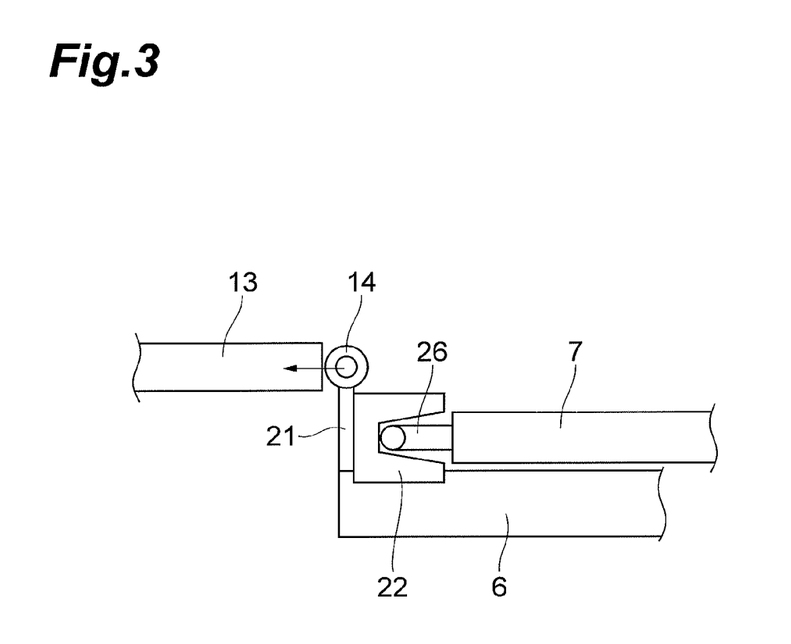
FIG. 3 is a plan view schematically illustrating a slide support mechanism and a door panel lock mechanism which are depicted in FIG. 1.

As also illustrated in FIG. 3, the door panel lock mechanisms 25 comprise the two latches 22 respectively attached to the upper and lower parts of the front end of the slide door panel 6 and two strikers 26 respectively attached to the upper and lower parts of the front end of the swing door panel 7 and adapted to engage their corresponding latches 22.

When the slide door panel 6 is fully opened, so that the latches 22 engage the strikers 26 (see FIG. 3), the slide door panel 6 and swing door panel 7 are locked with each other. The lock on the slide door panel 6 and swing door panel 7 is released when the outer door opening and closing handle 8 or inner door opening and closing handle 9 is operated so as to open the slide door panel 6.

When the slide door panel 6 and swing door panel 7 are locked with each other, the upper and lower rollers 14, 16 disengage from rear end parts (roller-introducing parts) of the upper and lower slide rails 13, 15, respectively. As a consequence, the slide door panel 6 is supported by the swing door panel 7 alone through the door panel lock mechanisms 25, middle slide rail 17, and roller 18, so as to be rotatable integrally with the swing door panel 7.

The vehicle door structure 1 further comprises two, i.e., upper and lower, swing door panel lock mechanisms 27 for locking the swing door panel 7 with respect to the vehicle body 2 when the swing door panel 7 is fully closed. The swing door panel lock mechanisms 27 comprise lock members 28 respectively attached to the upper and lower parts of the swing door panel 7 and strikers 29 (see FIG. 2A) which are respectively attached to the upper and lower parts of the vehicle body 2 and serve as engagement members for engaging the lock members 28.

When the swing door panel 7 is closed, the lock members 28 move toward the vehicle body 2 under a force of a spring (not depicted), so as to engage the strikers 29, whereby the swing door panel 7 and the vehicle body 2 are locked with each other. The lock on the swing door panel 7 and vehicle body 2 is released when the door opening and closing handle 10 is operated so as to open the swing door panel 7.

Figure 2C:
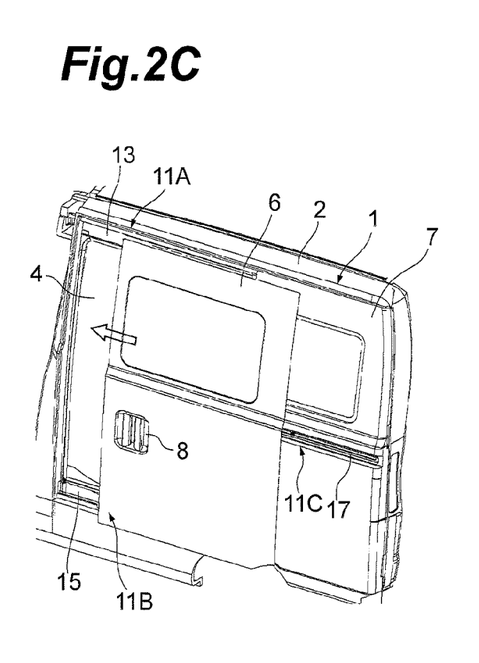

When closing the slide door panel 6 and swing door panel 7 from the state where the swing door panel 7 is fully open (see FIG. 2A) in thus constructed vehicle door structure 1, the swing door panel 7 is rotated at first so as to be fully closed (see FIG. 2B). Then, while in this state, the slide panel 6 is slid to the front side of the vehicle body 2, so as to be closed (see FIG. 2C).

Even when the swing door panel 7 is closed with respect to the vehicle 2, the lock members 28 may fail to engage the strikers 29, so that the swing door panel lock mechanisms 27 lock the swing door panel 7 and vehicle body 2 incompletely with each other. Even when the swing door panel 7 and vehicle body 2 are thus locked incompletely, the slide door panel 6 can be closed if the rollers 14, 16 of the slide door panel 6 can enter the slide rails 13, 15, respectively. If the slide door panel 6 is closed while the swing door panel 7 and vehicle body 2 are locked incompletely, abnormal noises may occur during when the vehicle is running.

Figure 4A:
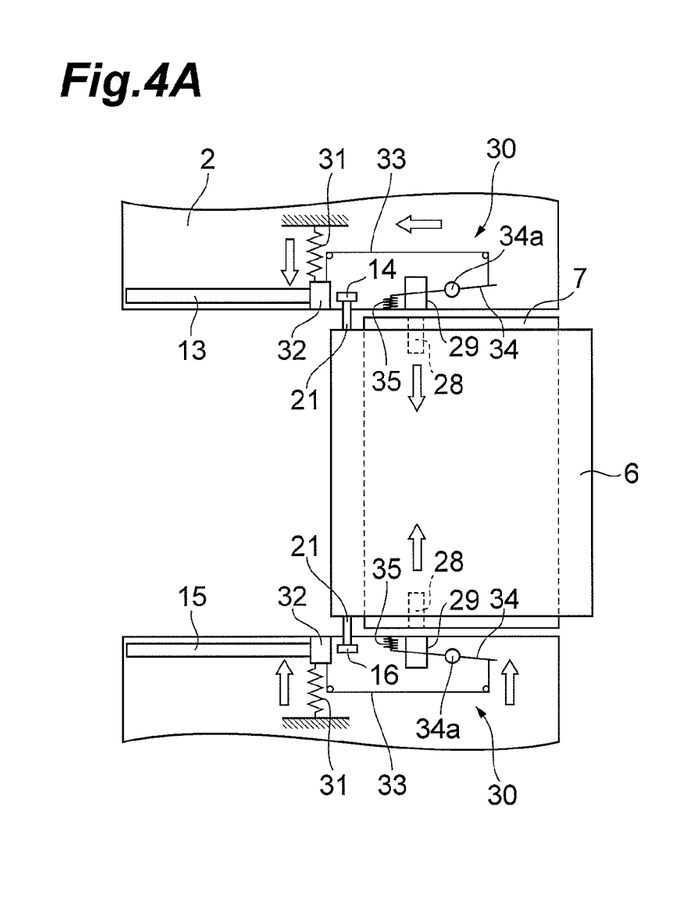
FIGS. 4A and 4B are a set of diagrams illustrating slidability setting mechanisms provided with a vehicle body together with slide support mechanisms and swing door panel lock mechanisms.
Figure 4B:
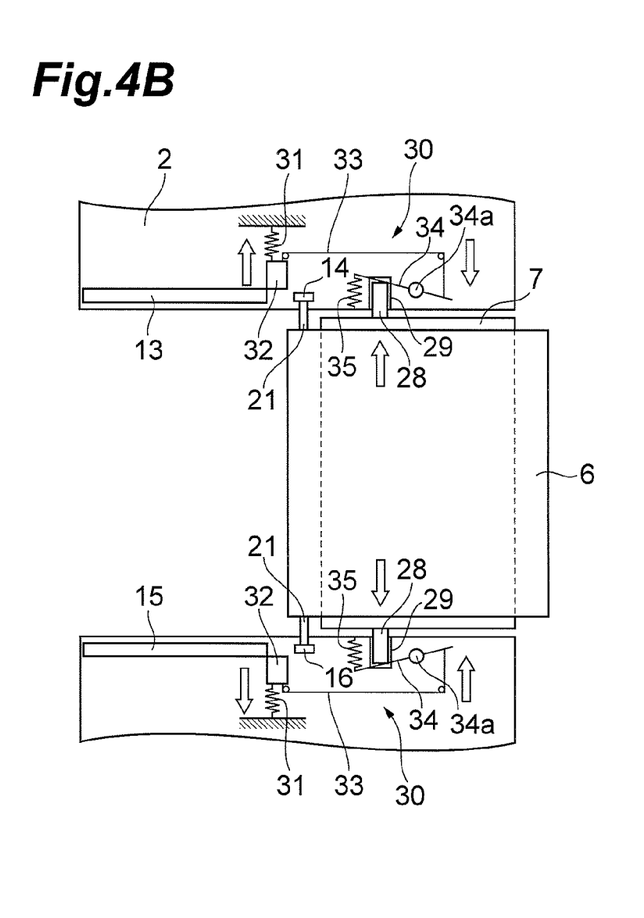

For overcoming such inconveniences, the vehicle door structure 1 of this embodiment further comprises slidability setting mechanisms 30 respectively disposed in the upper and lower parts of the vehicle body 2 as illustrated in FIGS. 4A and 4B. FIGS. 1, 2A and 2B omit the slidability setting mechanisms 30.

The slidability setting mechanisms 30 have roller stoppers 32 attached to the vehicle body 2 through springs 31 and swing members 34 as lock detection members connected to the roller stoppers 32 through cables 33 while being swingably attached to the vehicle body 2 through spindle parts 34a.

The roller stoppers 32, which are members for blocking the rollers 14, 16 from being introduced to the slide rails 13, 15, are movable between positions for closing and opening the rear end parts (roller-introducing parts) of the slide rails 13, 15. The springs 31 are connected to the vehicle body 2 and roller stoppers 32 and bias the roller stoppers 32 in such directions as to close the rear end parts of the slide rails 13, 15. One end parts of the swing members 34 are connected to the cables 33. The other end parts of the swing members 34 are attached to the vehicle body 2 through springs 35 and arranged within the strikers 29. The springs 35 bias the swing members 34 so that their other end parts tilt toward the openings of the strikers 29. The swing members 34 are members which come into contact with the lock members 28 of the swing panel lock mechanisms 27, so as to detect engagements of the lock members 28 with the strikers 29.

In a state where the lock members 28 retract to the inside of the vehicle body 2 without engaging the strikers 29 as illustrated in FIG. 4A, i.e., a state (unlocked state) where the swing door panel 7 and vehicle body 2 are not locked with each other, the roller stoppers 32 enter positions in front of the rear end parts (roller-introducing parts) of the slide rails 13, 15 under biasing forces of the springs 31. At this time, the cables 33 are pulled toward the roller stoppers 32. In this state, even when the slide door panel 6 is slid to the front side of the vehicle body 2 so as to be closed, the rollers 14, 16 hit the roller stoppers 32 and fail to enter the slide rails 13, 15, thereby making it impossible to close the slide door panel 6.

In a state where the lock members 28 project to the outside of the vehicle body 2 and engage the strikers 29 as illustrated in FIG. 4B, i.e., a state where the swing door panel 7 and vehicle body 2 are locked with each other, on the other hand, the lock members 28 push parts on the spring 35 side of the swing members 34 against the biasing forces of the springs 35, so as to swing the swing members 34, thus pulling the cables 33 toward the swing members 34, whereby the roller stoppers 32 retract from the positions in front of the rear end parts (roller-introducing parts) of the slide rails 13, 15 against the biasing forces of the springs 31. In this state, when the slide door panel 6 is slid to the front side of the vehicle 2 so as to be closed, the rollers 14, 16 can enter the slide rails 13, 15 without hitting the roller stoppers 32, whereby the slide door panel 6 can be closed.

Thus, the slidability setting mechanisms 30 are mechanisms which permit the rollers 14, 16 to be introduced to the slide rails 13, 15 only when the swing members 34 serving as lock detection members detect that the swing door panel 7 is locked with respect to the vehicle body 2, but otherwise prohibit the rollers 14, 16 from doing so.

As in the foregoing, unless the swing door panel 7 and vehicle 2 are completely locked with each other, this embodiment makes it impossible for the rollers 14, 16 to be introduced to the slide rails 13, 15, whereby the slide door panel 6 cannot be closed. This can prevent the slide door panel 6 from closing in the state where the swing door panel 7 and vehicle body 2 are locked incompletely with each other. As a result, abnormal noises can securely be prevented from occurring during when the vehicle is running.

The springs 35, through which the swing members 34 are attached to the vehicle body 2 in this embodiment, are not necessary in particular.

Figure 5A:
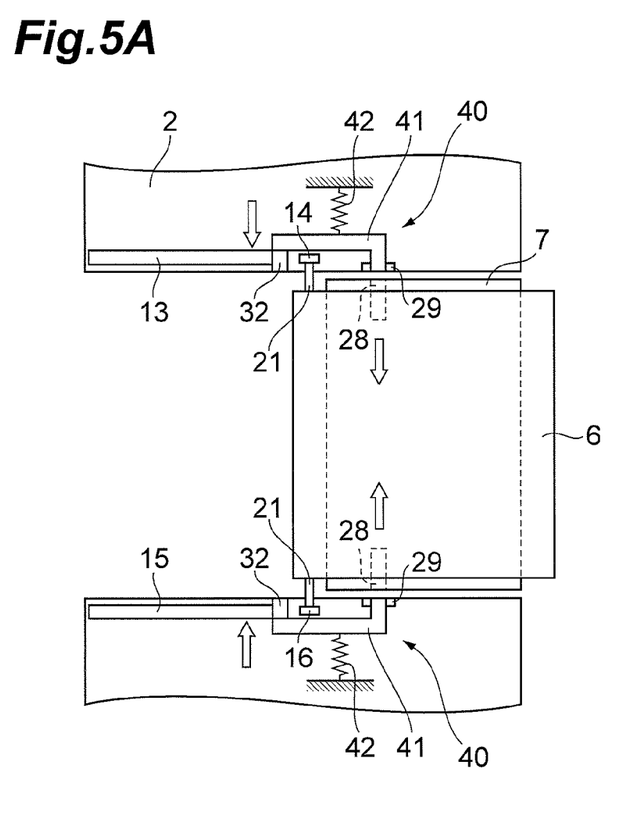
FIGS. 5A and 5B are a set of diagrams illustrating a modified example of the slidability setting mechanisms depicted in FIGS. 4A and 4B.
Figure 5B:
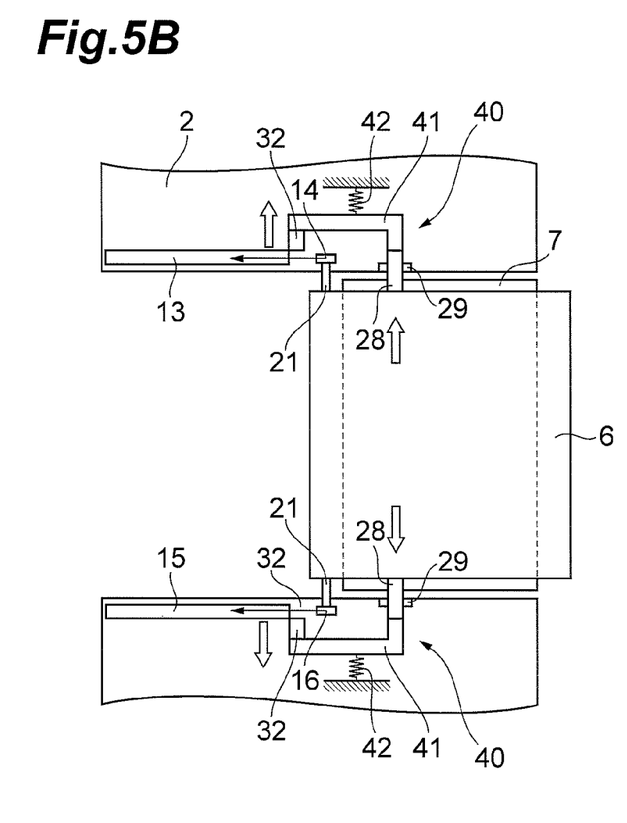

FIGS. 5A and 5B are a set of diagrams illustrating a modified example of the slidability setting mechanisms 30 depicted in FIGS. 4A and 4B. Slidability setting mechanisms 40 of the modified example in these diagrams comprise the above-mentioned roller stoppers 32 and rods 41 serving as lock detection members. The rods 41 have one end parts to which the roller stoppers 32 are secured and the other end parts arranged within the strikers 29. That is, the rods 41 are lock detection members which detect that the lock members 28 engage the strikers 29. The rods 41 are surrounded by partitions (not depicted) disposed in the vehicle body 2 longitudinally and laterally thereof, so as to be movable only vertically. The rods 41 are attached to the vehicle body 2 through springs 42. The springs 42 bias the rods 41 so as to move the roller stoppers 32 in such directions as to close the rear end parts (roller-introducing parts) of the slide rails 13, 15.

In a state where the lock members 28 retract to the inside of the vehicle body 2 without engaging the strikers 29 as illustrated in FIG. 5A, i.e., a state where the swing door panel 7 and vehicle body 2 are not locked with each other, the roller stoppers 32 enter respective positions in front of the rear end parts (roller-introducing parts) of the slide rails 13, 15. In this state, even when the slide door panel 6 is slid to the front side of the vehicle body 2 so as to be closed, the rollers 14, 16 hit the roller stoppers 32 and fail to enter the slide rails 13, 15, thereby making it impossible to close the slide door panel 6.

In a state where the lock members 28 project to the outside of the vehicle body 2 and engage the strikers 29 as illustrated in FIG. 5B, i.e., a state where the swing door panel 7 and vehicle body 2 are locked with each other, on the other hand, the roller stoppers 32 retract from the positions in front of the rear end parts (roller-introducing parts) of the slide rails 13, 15 through the rods 41 against the biasing forces of the springs 42. In this state, when the slide door panel 6 is slid to the front side of the vehicle 2 so as to be closed, the rollers 14, 16 can enter the slide rails 13, 15 without hitting the roller stoppers 32, whereby the slide door panel 6 can be closed.

This can also prevent the slide door panel 6 from closing in the state where the swing door panel 7 and vehicle body 2 are locked incompletely with each other.

The present invention is not limited to the above-mentioned embodiment. For example, the slidability setting mechanisms 30, 40, which are disposed in the upper and lower parts of the vehicle body 2 in the above-mentioned embodiment, may be provided in one of the upper and lower parts of the vehicle body 2 alone.

While the above-mentioned embodiment uses the swing members 34 or rods 41 as lock detection members, so as to mechanically detect the lock on the swing door panel 7 and vehicle body 2, the lock detection members are not limited to this mode. For example, sensors for detecting whether or not there are the lock members 28 may be provided within the strikers 29, so as to electrically sense the lock on the swing door panel 7 and vehicle body 2. In this case, a drive unit such as an actuator for driving the roller stoppers 32 and a control unit for controlling the drive unit according to a value detected by a sensor are provided as a slidability setting mechanism.

While the direction of pushing the lock member 28 and the direction of swinging the swing member 34 or moving the rod 41 are the same in the above-mentioned embodiment, this is not restrictive in particular. For example, the contact part of the lock member 28 with the swing member 34 or rod 41 may be tapered, so as to shift the swinging direction of the swing member 34 or moving direction of the rod 41. This reduces restrictions on spaces for providing the slidability setting mechanisms 30, 40.

While the roller stoppers 32 are arranged at positions in front of the rear end parts (roller-introducing parts) of the slide rails 13, 15 in the above-mentioned embodiment, this is not restrictive in particular. For example, the slide rails 13, 15 may have cutouts near their rear end parts, into which sheet-shaped roller stoppers may slide.

The above-mentioned embodiment is constructed such that the slide door panel 6 opens and closes the first region located on the front side of the rear door opening 4, while the swing door panel 7 opens and closes the second region located on the rear side of the rear door opening 4 in cooperation with the slide door panel 6. However, the vehicle door structure of the present invention is also applicable to one constructed such that the slide door panel 6 opens and closes the first region located on the rear side of the rear door opening 4, while the swing door panel 7 opens and closes the second region located on the front side of the rear door opening 4 in cooperation with the slide door panel 6. The vehicle door structure of the present invention is also applicable to one having slide and swing door panels adapted to open and close a door opening provided in a rear part of the vehicle body 2.

What is claimed is:

1. A vehicle door structure comprising a slide door panel for opening and closing a first region of a door opening provided in a side or rear part of a vehicle body and a swing door panel for opening and closing a second region of the door opening in cooperation with the slide door panel, the vehicle door structure further comprising:
   a lock mechanism for locking the swing door panel with respect to the vehicle body when the swing door panel is fully closed;
   a slide rail provided with the vehicle body so as to extend in an opening and closing direction of the slide door panel;
   a roller provided with the slide door panel and adapted to be guided by the slide rail; and
   a slidability setting mechanism for permitting the roller to engage with and slide along the slide rail in the opening and closing direction of the slide door panel only when the swing door panel is locked with respect to the vehicle body by the lock mechanism.

2. The vehicle door structure according to claim 1, wherein the lock mechanism has a lock member provided with the swing door panel and an engagement member, provided with the vehicle body, for engaging the lock member;
   wherein the slidability setting mechanism comprises a roller stopper for blocking the roller from engaging with and sliding along the slide rail and a lock detection member, connected to the roller stopper, for detecting an engagement of the lock member with the engagement member, allows the roller stopper to enter a position in front of a roller-introducing part of the slide rail when the engagement of the lock member with the engagement member is undetected by the lock detection member, and retracts the roller stopper from the position in front of the roller-introducing part of the slide rail when the engagement of the lock member with the engagement member is detected by the lock detection member.

3. The vehicle door structure according to claim 2, wherein the roller stopper is attached to the vehicle body through a spring;
   wherein the lock detection member is swingably attached to the vehicle body;
   wherein the roller stopper is connected to one side of the lock detection member through a connection member; and
   wherein the lock member abuts to an other end side of the lock detection member.

4. The vehicle door structure according to claim 2, wherein the lock detection member is attached to the vehicle body through a spring;
   wherein the roller stopper is fixed to one side of the lock detection member; and
   wherein the lock member abuts to an other end side of the lock detection member.

* * * * *